(12) United States Patent
Lu

(10) Patent No.: US 6,363,158 B1
(45) Date of Patent: Mar. 26, 2002

(54) ADJUSTABLE HANGING-TYPE EARPHONE

(75) Inventor: Shu-Chen Lu, Taipei (TW)

(73) Assignee: Wanstonic Electronics Ltd., Taipei Hsien (TW)

( * ) Notice: Subject to any disclaimer, the term of this patent is extended or adjusted under 35 U.S.C. 154(b) by 0 days.

(21) Appl. No.: 09/933,750

(22) Filed: Aug. 22, 2001

(51) Int. Cl.$^7$ .............................................. H04R 25/00
(52) U.S. Cl. ...................................... 381/381; 381/374
(58) Field of Search ................................. 381/328, 330, 381/309, 370, 374, 375, 377, 378, 379, 380, 381, 300, FOR 149, FOR 150; 379/430; 181/129

(56) References Cited

U.S. PATENT DOCUMENTS

| 262,921 A | * | 8/1882 | Berliner | 381/374 |
| 4,529,058 A | * | 7/1985 | Emery | 381/374 |
| 5,761,298 A | * | 6/1998 | Davis et al. | 381/300 |

* cited by examiner

*Primary Examiner*—Huyen Le
(74) *Attorney, Agent, or Firm*—Rabin & Berdo, P.C.

(57) ABSTRACT

An adjustable hanging-type earphone, comprising a main unit fixed with a speaker seat, a slide unit serving to mount on the user's ear, and a spring wire for better fastening purpose of the earphone. Inside the main unit is a fixing shaft and a positioning shaft, which are inserted in the fixing hole and positioning slot on the top of the slide unit. The spring wire is attached to the top of the main unit. Thereby using the fixing shaft and fixing hole on the main unit as a pivot, and the positioning shaft and positioning slot as a freely adjustable fastening device, the position of the slide unit can be adjusted in relation to the main unit, to form an appropriate circle of tightness around the user's ear. The freely bendable spring wire is used to wind around the user's head or neck to aid the positioning purpose of the earphone on different sizes of the user's ear, to effectively upgrade its applicability and enhance wearing comfort.

1 Claim, 6 Drawing Sheets

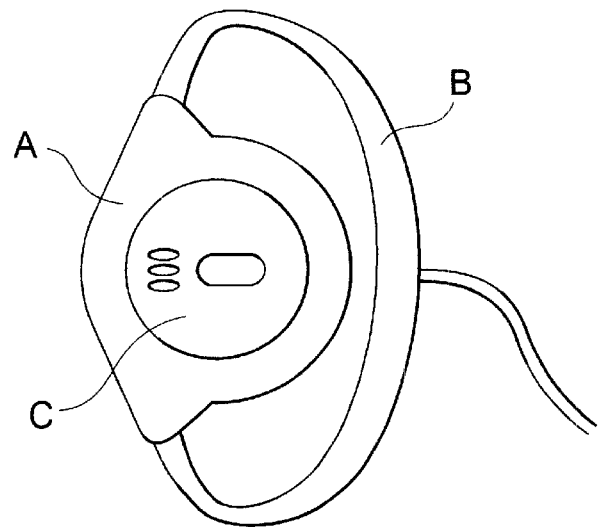
*Fig.1*  PRIOR ART
PRIOR ART  *Fig.2*
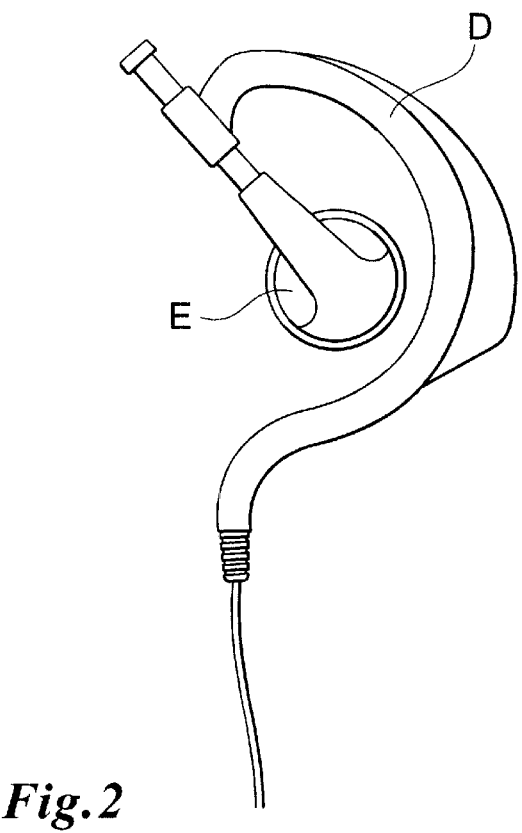

ADJUSTABLE HANGING-TYPE EARPHONE

BACKGROUND OF THE INVENTION

1. Field of the invention

This invention relates to an adjustable hanging-type earphone, particularly one comprising a main unit fixed with a speaker seat, a slide unit serving to mount on the user's ear, and a spring wire for better fastening purpose of the earphone. The slide unit is assembled inside the main unit, thereby using the fixing shaft and fixing hole on the main unit as a pivot, and the positioning shaft and positioning slot as a freely adjustable fastening device, the position of the slide unit can be adjusted in relation to the main unit, to form an appropriate circle of tightness around the user's ear. The freely bendable spring wire is used to wind around the user's head or neck to aid the positioning purpose of the earphone on different sizes of the user's ear, to effectively upgrade its applicability and enhance wearing comfort.

2. Background of the invention

Earphones have been widely used in a wide variety of applications, such as communication, listening to music, teaching, etc. Earphones come in various types, styles and models. After a long period of development, earphones can be categorized into ear-hood type, earplug type, and ear-wrapping type. The ear-hood type involves a heavy and cumbersome headband, which causes high heat (especially in summer) after it has been worn on the user's ear for an extended period of time, so it is unpractical to wear it for a long time. The earplug type is inserted inside the user's ear hole, and can easily cause pain or discomfort because the user's ear is stuffed with the plug. Therefore, the introduction of ear-wrapping earphones in recent years has become the favorite of users. As shown in FIG. 1, a prior art of ear-wrapping earphone has an ear wrapper B at the rear of a main unit A, with a speaker C that is glued and fixed to the inside of the main unit A. To use such an ear-wrapping type of earphone, the user directly wraps the ear wrapper B onto the user's ear. Since human ear is a cartilage organ, the ear lobe is bent and compressed before the earphone can be fitted onto it. After the ear wrapper B is inserted in place, the ear lobe restores its original shape to keep the ear wrapper B on the ear. Then, the speaker C is aligned to the ear hole, so the sound emitted from the speaker can be transmitted into the ear. But such conventional ear-wrapping earphone involves its main unit A and ear wrapper B that are made of rigid materials as one unit. The size of the ear wrapper B is fixed and cannot be changed. Therefore, such a uniform sized earphone could not be adjusted to suit different users with different ear sizes. A user with a larger ear size could feel pain or discomfort after wearing such a fixed-size earphone for an extended period of time. On the other hand, a user with a smaller ear size could easily find the earphone slipping away, or the speaker C out of alignment with the ear hole. For that reason, the manufacturers have introduced a ear-hanging type of earphone with adjustable speaker position, as shown in FIG. 2. That type of ear-hanging earphone has a speaker E at the front of a main unit D shaped like a "D" figure. The speaker E can be adjusted up or down to suit the user's ear shape and position of ear hole. Such type of ear-hanging earphone serves only one main function, that is, the height adjustment of the speaker E. So, with its main unit D still made of a rigid material in a fixed size, it involves the same inability to suit the different ear sizes of different users, as is found in the aforementioned ear-wrapping type earphone. In case the size of the main unit D is inconsistent with the user's ear size (too large or too small), the user could find it very uncomfortable, and the speaker E could easily be slipping out of position. Even if the position of its speaker E can be adjusted either up or down, but its axis is slipping away from the ear hole and could not be positioned properly, therefore the quality of the user's reception could be impaired.

BRIEF DESCRIPTION OF THE INVENTION

Therefore, with a view to seek possible improvement on the aforementioned shortcomings found in conventional earphones of ear-wrapping or ear-hanging types, the inventor has dedicated in research and development, based on many years experience in the research and development of various types of earphones, microphones and peripherals, and after repeated conceptions, drafting, test production, tests and modifications, has finally come up with the subject "adjustable ear-hanging earphone" that comprises a main unit, a slide unit and a spring wire, wherein the slide unit can be moved in relation to the main unit for adjustment of the circle of tightness, and the spring wire can be easily pulled to wind around the user's head or neck, to suit different users with different ear sizes, upgrade the range of applications and better comfort and stability.

BRIEF DESCRIPTION OF NUMERALS

10 main unit
11 speaker seat
12 fixing shaft
13 positioning shaft
20 slide unit
21 front rack
22 rear rack
23 fixing hole
24 positioning slot
30 spring wire
40 speaker
41 signal cord
50 microphone

BRIEF DESCRIPTION OF DRAWINGS

The drawings of preferred embodiments of this invention are described in following details to enable better understanding.

FIG. 1 is a plan view of a prior art of plug-type earphone.

FIG. 2 is a plan view of a prior art of wrapping-type earphone.

DETAILED DESCRIPTION OF PREFERRED EMBODIMENTS

Figure 3:
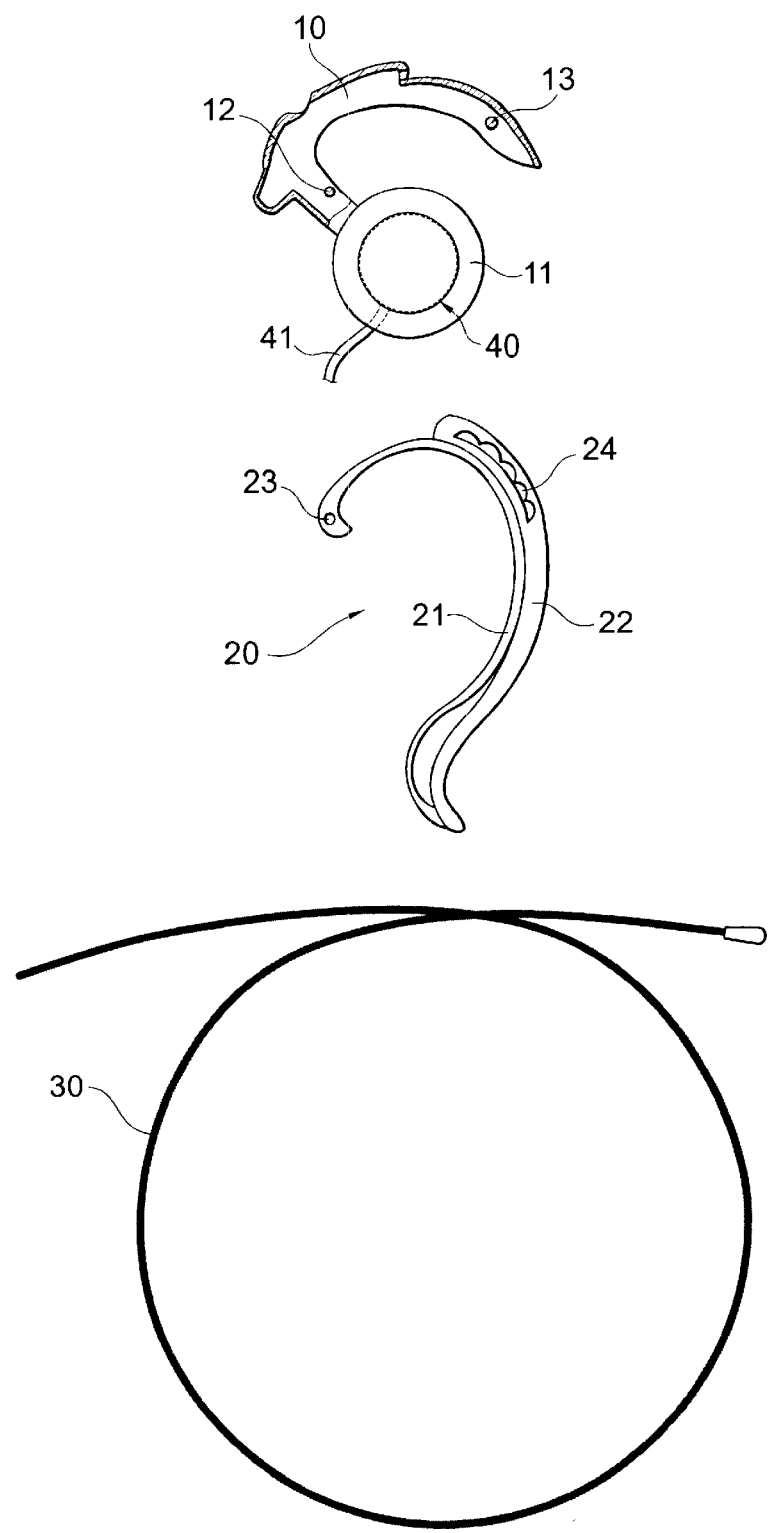
FIG. 3 is a disassembled view of the invention.
Figure 4:
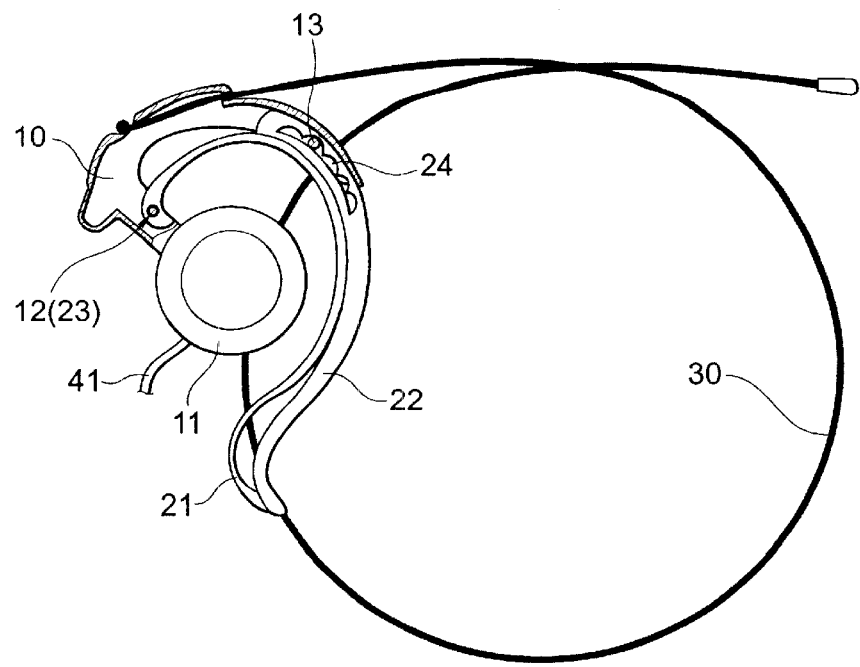
FIG. 4 is a section view of the assembled invention.
Figure 5:
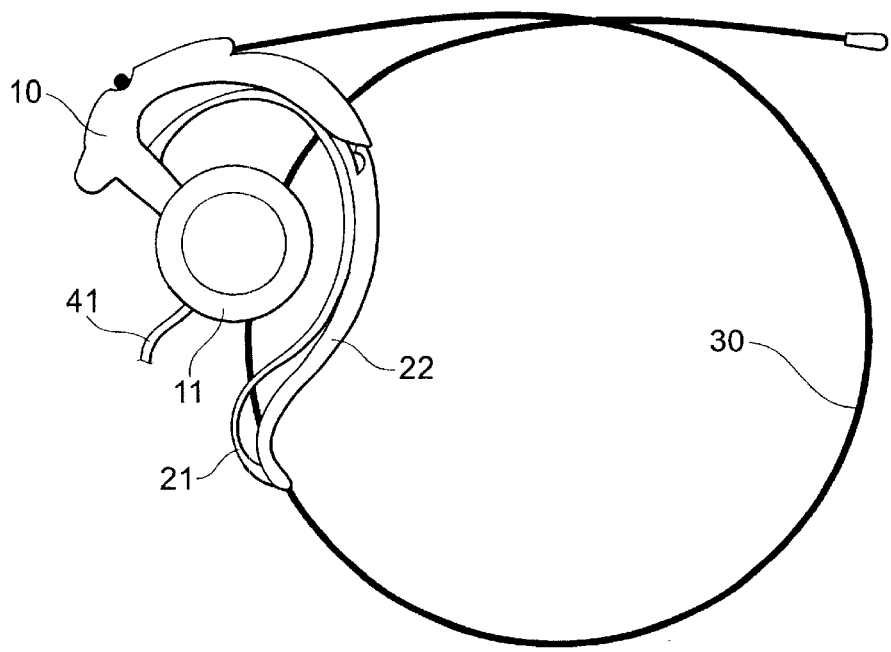
FIG. 5 is an exterior view of the assembled invention.

As shown in FIGS. 3 through 5, this invention comprises a main unit 10, a slide unit 20 and a spring wire 30, wherein:

The main unit 10 is preferably made of a rigid material, shaped like a reversed "U" with an enclosed upper part and an opened lower part. Protruding downward from its front is a speaker seat 11, the speaker seat 11 serving to accommodate a speaker 40. The speaker 40 has a signal cord 41 that can be pulled directly out of the speaker seat 11, or from the rear of the main unit 10. Since the speaker 40 is not one of the characteristics of this invention, it requires no elaboration. On top of the speaker seat 11 is a horizontal fixing shaft 12. At the rear of the speaker seat 11 is also a horizontal positioning shaft 13.

The slide unit 20 is shaped like a "C" figure, composed of a front rack 21, made of a rigid material, at its front part, and a rear rack 22, made of a flexible material, at its rear part. At the front of the front rack 21 is a fixing hole 23. At the top of the rear rack 22 is a positioning slot 24 containing waveforms inside. The relative positions of the fixing hole 23 and the positioning slot 24 are designed to match the fixing shaft 12 and the positioning shaft 13 of the main unit 10. The top of the slide unit 20 is inserted inside the main unit 10, to a position where the fixing shaft 12 is aligned with the fixing hole 23, and the positioning shaft 13 is aligned with the positioning slot 24.

The spring wire 30 is a flexible and tenacious, fine and long wire that can be bent or twisted freely; its front end is fastened to the top of the main unit 10, while the tail of the wire is free hanging.

Figure 6:
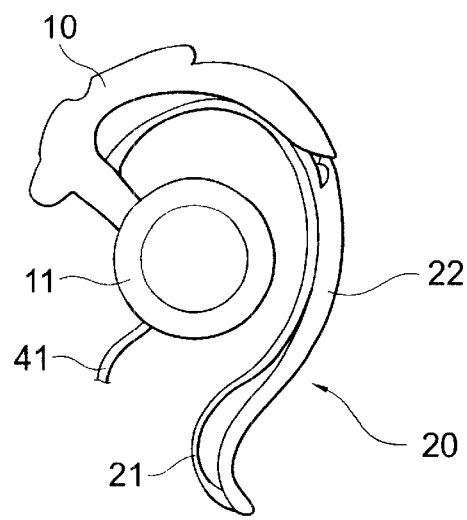
FIG. 6 is a view of preferred embodiment of the invention, showing the assembly of the main unit and the slide unit.
Figure 7:
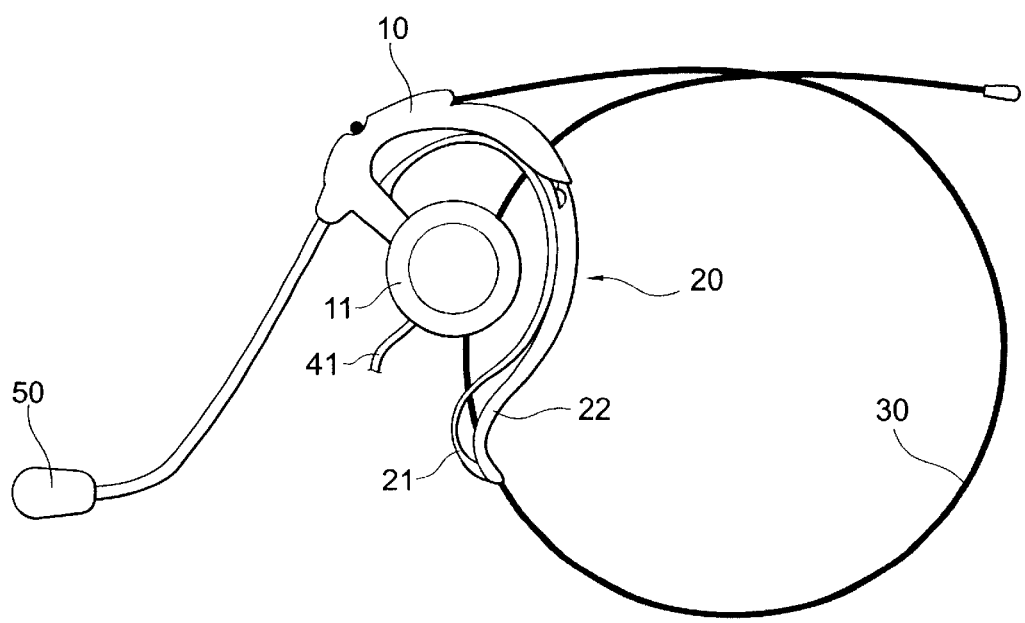
FIG. 7 is a view of preferred embodiment of the invention, showing a microphone assembled at the front of the main unit.
Figure 8:
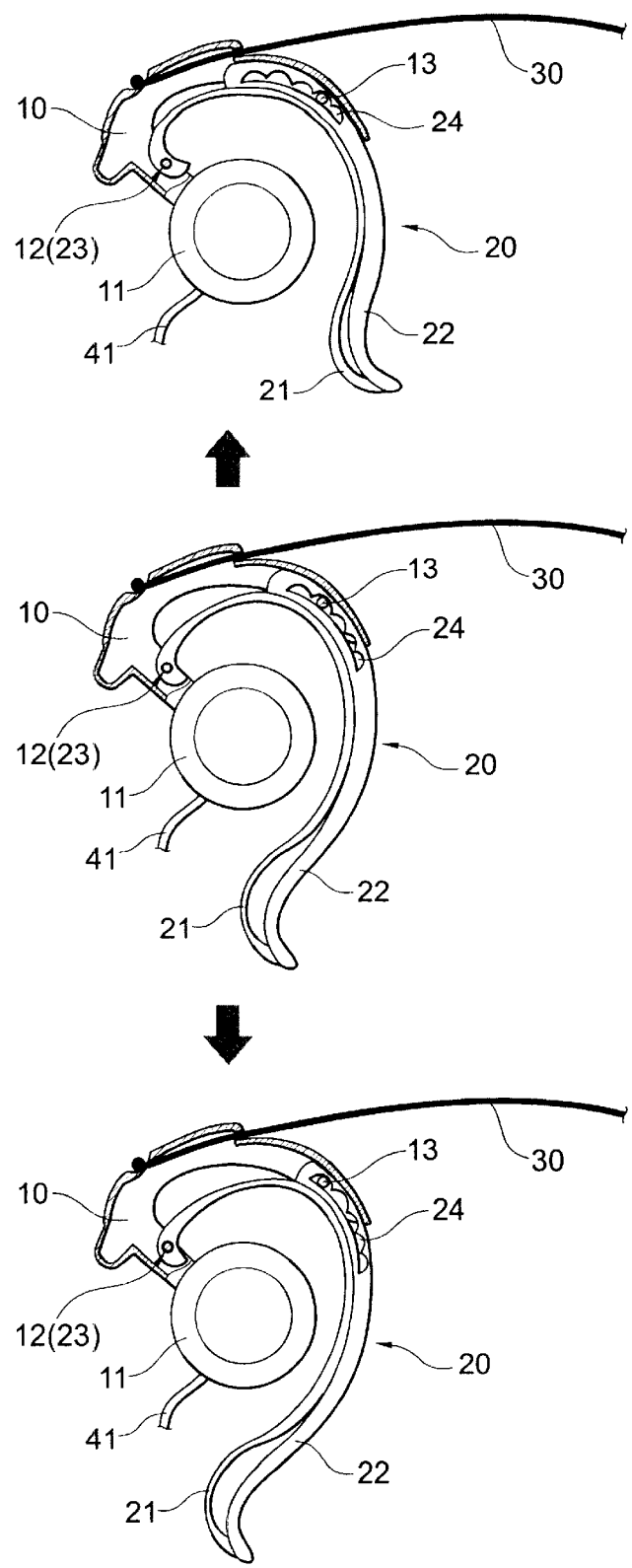
FIG. 8 illustrates the range of adjustment of the slide unit of the invention.
Figure 9:
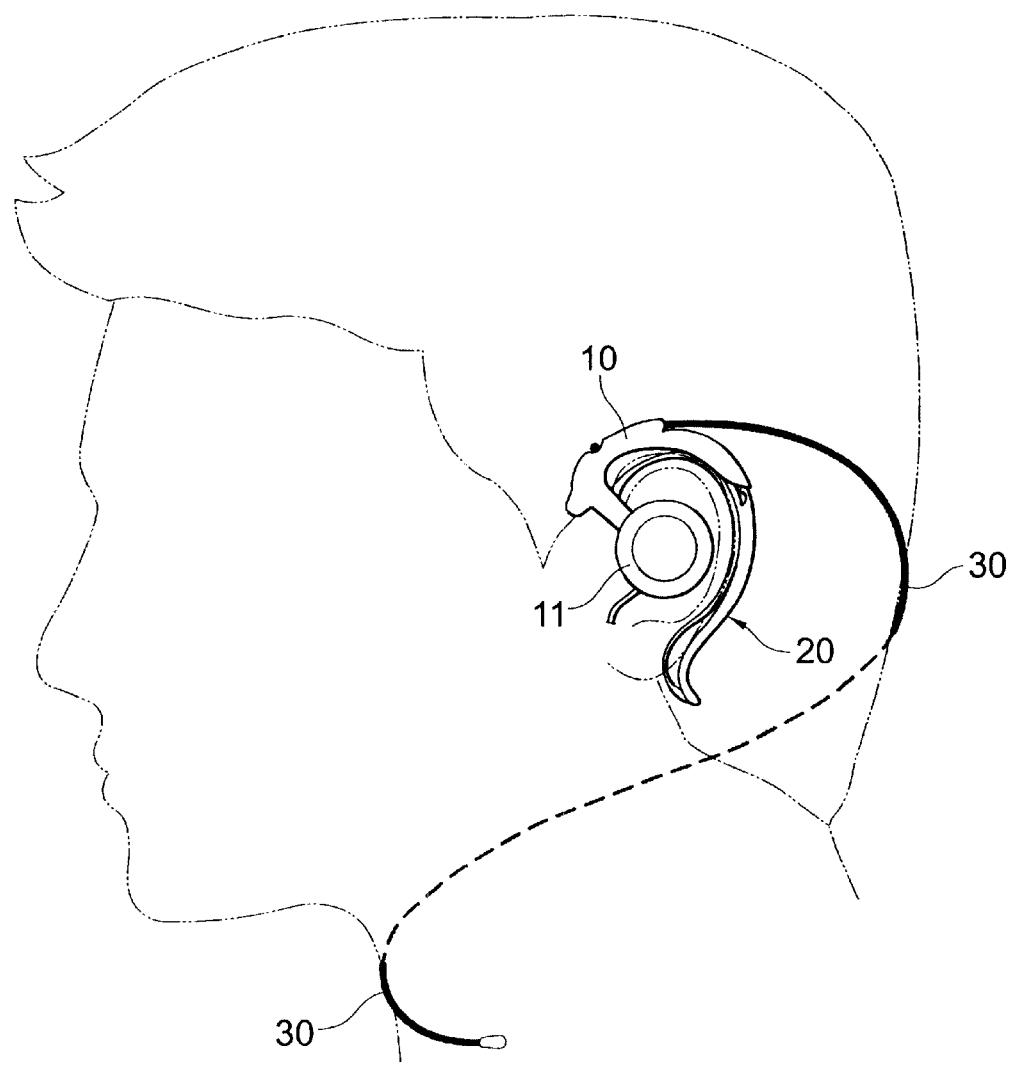
FIG. 9 illustrates how the spring wire is employed to assist the fastening function of the invention.

As described above, the invention can be put to application merely by using the assembly of the main unit 10 and the slide unit 20, as shown in FIG. 6; or by suing the spring wire 30 in addition to the main unit 10 and the slide unit 20, as shown in FIG. 5. Furthermore, it can also be put to application by using an additional microphone 50 that is fitted to the front of the main unit 10, as shown in FIG. 7. Adjustment of the invention is illustrated in FIG. 8. When the invention is worn on the user's ear, the feature of adjustable slide unit 20 in relation to the main unit 10 can be employed by the user, adjusting the slide unit 20 within a range of tightness on the user's ear. Adjustment is shown in the drawing, using the fixing shaft 12 (and the fixing hole 23) as a pivot, the user can turn the slide unit 20 either upward or downward. To enlarge the fastening circle (to suit a user with larger ears), turn the slide unit 20 upward, so the positioning shaft 13 moves within the positioning slot 24. When an appropriate tightness is obtained, the positioning shaft 13 rests at a trough (of the wave) at a lower position inside the positioning slot 24. Conversely, to reduce the fastening circle (to suit a user with smaller ears), turn the slide unit downward, so the positioning shaft 13 moves up within the positioning slot 24. Accordingly, the user can adjust the slide unit 20 in an easy and simply way to obtain an appropriate circle of tightness of the invention to suit the user's ear size, not only for better wearing comfort, but the speaker 40 can also be aligned exactly to the ear hole. On the other hand, in case a type equipped with a spring wire 30 is used, as shown in FIG. 9, the free-bending spring wire 30 can be pulled to wind around the user's head or neck. The spring wire 30 serves additional applicability for sturdy and firm attachment when the invention is used in outdoor environment where larger physical activities may be involved.

To conclude, the invention involves delicate and sophisticated structural design for effective improvement on the shortcomings of convention plug-type or hanging-type earphones, enabling convenient adjustment of the circle of tightness to suit different ear sizes, effective enhancement of the range of applicability, better wearing comport, firm attachment, etc. Compared with conventional products of the same class, the invention has its inventive step, improvement and industrial applicability. Accordingly, this application is filed for a patent right. Your favorable consideration shall be appreciated.

What is claimed is:

1. An adjustable hanging-type earphone, comprising a main unit, a slide unit and a spring wire, wherein:

the main unit, made of a rigid material, is shaped like a reversed "U" with an enclosed upper part and an opened lower part, protruding downward from its front being a speaker seat, on top of the speaker seat being a horizontal fixing shaft, at the rear of the speaker seat being a horizontal positioning shaft;

the slide unit is shaped like a "C" figure, composed of a front rack, made of a rigid material, at its front part, and a rear rack, made of a flexible material, at its rear part; at the front of the front rack being a fixing hole, at the top of the rear rack being a positioning slot; the relative positions of the fixing hole and the positioning slot being designed to match the fixing shaft and the positioning shaft of the main unit; the top of the slide unit being inserted inside the main unit, to a position where the fixing shaft and the positioning shaft of the main unit are inserted into the fixing hole and the positioning slot of the slide unit and assembled as one unit;

the spring wire is a flexible and tenacious, fine and long wire that can be bent or twisted freely; its front end being fastened to the top of the main unit, while the tail of the wire being free hanging.

* * * * *